United States Patent Office 3,766,177
Patented Oct. 16, 1973

3,766,177
CERTAIN DELTA-3 CEPHALOSPORIN COMPOUNDS

J. Alan Webber and Earle M. Van Heyningen, Indianapolis, Ind., assignors to Eli Lilly and Company, Indianapolis, Ind.
No Drawing. Continuation-in-part of application Ser. No. 790,842, Jan. 13, 1969, which is a continuation-in-part of applications Ser. No. 703,523, Feb. 7, 1968, and Ser. No. 802,643, Feb. 26, 1969, which is a continuation-in-part of said application Ser. No. 703,523, all now abandoned. This application Aug. 17, 1970, Ser. No. 64,614
Int. Cl. C07d 99/24
U.S. Cl. 260—243 C                5 Claims

ABSTRACT OF THE DISCLOSURE 3-methylthiomethyl- and 3-methoxymethyl-7-[2'-amino-2' - (3"-hydroxyphenyl)acetamido]-Δ³-cephem-4-carboxylic acids, useful as antibiotics, which can be administered by the oral route.

CROSS REFERENCES

This application is a continuation in part of:

(a) Our prior application Ser. No. 790,842, filed Jan. 13, 1969, now abandoned, which application is a continuation-in-part of or application Ser. No. 703,523 filed Feb. 7, 1968, now abandoned, and (b) Our prior application Ser. No. 802,643, filed Feb. 26, 1969, now abandoned, which application is a continuation-in-part of application Ser. No. 703,523, filed Feb. 7, 1968, now abandoned.

INTRODUCTION

This invention relates to delta-3-cephalosporin antibiotic compounds. More particularly, this invention provides a small group of delta-3-cephalosporanic acid derivatives which are useful as orally administerable antibiotics.

BACKGROUND OF THE INVENTION

The semi-synthetic production of 7-acylamidodesacetoxycephalosporin antibiotics from penicillin starting materials has become of importance recently, due to the process invention of Morin and Jackson (U.S. Pat. 3,275,626) who describe and claim a process for converting penicillin sulfoxide esters to desacetoxycephalosporanic acid esters and to the improvements on that Morin-Jackson process by Chauvette and Flynn (U.S. Pat. Nos. 3,536,698 and 3,536,705 issued Oct. 27, 1970) who found that certain esters of the penicillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper (U.S. Pat. No. 3,647,787 issued Mar. 7, 1972, and applications Ser. No. 636,593, and Ser. No. 636,592, both filed May 8, 1967 and both now abandoned) who found that the use of certain solvents directed the heat rearrangement of the penicillin sulfoxide esters more specifically toward production of the corresponding desacetoxycephalosporin esters permitted the use of lower temperatures. Some of the 7-acylamidodesacetoxycephhalosporanic acid compounds have been found to have unique properties as antibiotics in their own right. For example, cephalexin, 7-[D-alpha-aminophenylacetamido] -3-methyl-Δ³-cephem-4-carboxylic acid zwitterion, and pharmaceutically acceptable cationic and anionic salt forms thereof are useful as oral antibiotics in combatting infections caused, e.g., by penicillin resistant strains of Staphylococcus aureus, and many other Gram-positive and Gram-negative microorganisms.

One of the unique advantages of Δ³-desacetoxycephalosporin compounds, that is, compounds of the general formula

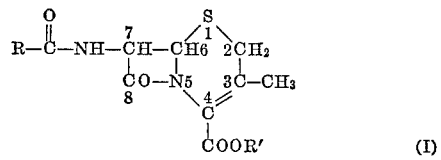

(I)

wherein R is the residue of the acylamido group in the 7-position and R' is hydrogen, a salt forming cation, an ester group, or an anionic charge when the COO —forms a salt with a cation either within or outside the molecule, is that such compounds can now be prepared from penicillin sulfoxide esters by the Morin-Jackson process, especially as improved by the Chauvette-Flynn and R. D. G. Cooper improvements.

In efforts to improve and expand the properties and utilities of these penicillin derived semi-synthetic cephalosporin substances, efforts have been expended on changing the 3-methyl group of the above Δ³-desacetoxycephalosporins to a group which gives the resulting cephalosporin compound enhanced antibiotic activity against one or more Gram-positive or Gram-negative microorganisms. However, to date at least, it has not been possible to convert directly a Δ³-desacetoxycephalosporin, to a 3-methyl functionalized Δ³-cephalosporin in any significant yield. In our prior application, Ser. No. 703,523, filed Feb. 7, 1968, and now abandoned, we disclosed a method for converting Δ²-desacetoxycephalosporin ester compounds to 3-bromomethyl- and 3-(functionalized methyl)-Δ²-cephalosporin esters and the reason why it is necessary to do so in the preparation of some cephalosporins. It was there pointed out that 3-cyanomethyl- and the 3-alkoxymethyl-Δ²-cephem-4-carboxylate products of the process of that invention were useful as intermediates in the preparation of new and known Δ³-cephalosporin antibiotic compounds. Such Δ²-cephalosporin compounds can be converted to the corresponding Δ³-compounds by the oxidation of the Δ²-compound to the sulfoxide-Δ³-compound, and followed by reduction of the sulfoxide-Δ³-compound to the Δ³-cephalosporin compound by procedures disclosed therein. The processes are also described in Cooper U.S. Pat. No. 3,647,786, and in Murphy et al. U.S. Pat. No. 3,641,014. In addition, Lowell D. Hatfield has discovered an improved process for converting a penicillin sulfoxide ester to a desacetoxycephalosporin ester by heating the penicillin sulfoxide ester dissolved in the tertiary carboxamide containing solvent in a temperature range of from about 80° C. to about 150° C., under acid conditions, using in combination (1) an effective amount of a sulfonic acid, while (2) providing means for removing or inactivating water in the reaction mixture during the heating operation. Such process is claimed in United States patent application Ser. No. 799,504, filed Feb. 14, 1969, now U.S. Pat. No. 3,591,585.

In the cephalosporin antibiotic art, cephalosporin C (U.S. Pat. 3,093,638) is obtained by fermentation. It is a weak antibiotic, but is of substantial importance as the source from which 7-aminocephalosporanic acid (7-ACA), the so-called cephalosporin nucleus, is obtained by chemical cleavage methods now known. The 7-ACA is used to make many cephalosporanic acid derivatives, among which are sodium cephalothin (U.S. Pat. 3,218,318) and cephaloridine (U.S. Pat. 3,449,338) which are used extensively as parenteral antibiotics. Recently developed oral antibiotics have included cephaloglycin [D-7-(α-amino-α-phenylacetamido)-3 - acetoxymethyl-Δ³-cephem- 4-carboxylic acid] and cephalexin [D-7-(α-amino-α-phenylacetamido)-3-methyl-Δ³-cephem - 4 - carboxylic acid]. These are good oral antibiotics but efforts continue to find cephalosporin antibiotics which are more potent, more efficiently absorbed into the body, and which have a better shelf stability.

Also, U.S. Pats. 3,261,832 and 3,278,531, described a number of cephalosporin compounds substituted on the 3-methyl group with sulfur containing nucleophiles. However the compounds of 3,261,832 are said to have no practical antibiotic utility. They are useful only as intermediates in the preparation of cephalosporin antibiotics substituted on the 3-methyl with a pyridinium group. The sulfur containing substituents of the compounds of 3,278,531 are rather complex and not readily obtainable, and many of the compounds may be administered only by injection. In fact, it is stated that they are particularly valuable for the formulation of injectible preparations.

Belgian Pat. No. 719,710, published Feb. 20, 1969 discloses a group of 3-lower-alkyloxymethyl ether cephalosporin compounds as antibiotics for oral administration. The compound 7-[D-α-amino-α-phenylacetamido]-3-methoxymethyl-ceph - 3 - em - 4 - carboxylic acid is disclosed therein. Belgian Pat. No. 734,532, published Dec. 16, 1969 discloses a group of 3-lower-alkylthiomethyl cephalosporin compounds for the same use. The compound 7-[D-α-amino - α - phenylacetamido]-3-methylthiomethyl-ceph-3-em-4-carboxylic acid is named. There is general reference in these publications that the phenyl group in each case can be substituted with a halogen, hydroxy radical, a lower alkyl, nitro, amino, lower alkanoyl, lower alkoxyl or a lower alkylmercapto, but they do not indicate any preference for any particular substituent or the position thereof on the phenyl ring as giving any better results. However those skilled in the cephalosporin antibiotic art continue to search for new compounds which have lower median effective concentrations ($ED_{50}$ values). There is a need for cephalosporin antibiotics which can be administered orally to give a higher degree of blood level relative to the administered antibiotic drug dosage than prior cephalosporin antibiotics. In addition, the administered compound must have low minimum inhibitory concentrations (MIC values) against a variety of microorganisms comparable to known orally active cephalosporin antibiotic compounds.

It is an object of this invention to provide the art with some specific new cephalosporin oral antibiotics which will satisfy in a large degree the above needs.

SUMMARY OF THE INVENTION

Briefly, this invention provides as new compounds the 3-methoxymethyl- and 3-methylthiomethyl-7-[D-2'-amino-2'-(3''-hydroxyphenyl)acetamido]-Δ³-cephem - 4 - carboxylic acids, as zwitterions (inner salts) or as physiologically acceptable salts of such compounds. These compounds are useful as antibiotics against a variety of disease causing Gram-positive and Gram-negative microorganisms, e.g., against penicillin resistant strains of *Staphylococcus aureus*. They can be administered by a variety of methods but are of primary interest for use as oral antibiotics.

DETAILED DESCRIPTION OF THE INVENTION

The compounds of this invention can be represented by the structural formula

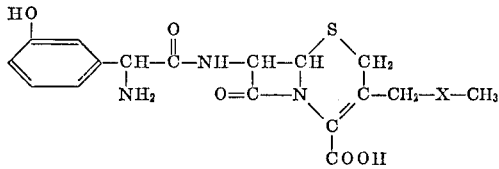

where X is bivalent oxygen or sulfur. It is written in the free amino acid form but often exists in its zwitterionic or inner salt form. The D stereoisomeric form of the m-hydroxyphenylglycine derivative is contemplated for use in these compounds but such steric configuration is not shown by this structure. These compounds can be used in the form of any physiologically acceptable salt form. Such salts include those with cations used as the sodium, potassium, ammonium, and amine cations such as 1,4-cyclohexanebis-(methylamine), as well as with anions from acids such as hydrochloric, sulfuric, and phosphoric acids, and the like. Hydrated forms of the zwitterionic and salt forms of these compounds are also within the scope of this invention.

Specific compounds within the scope of this invention include:

7-[D-2'-amino-2'-(3''-hydroxyphenyl)acetamido]-3-methoxymethyl-Δ³-cephem-4-carboxylic acid, and
7-[D-2'-amino-2'-(3''-hydroxyphenyl)acetamido]-3-methylthiomethyl-Δ³-cephem-4-carboxylic acid.

Compounds of this invention can be prepared by acylation of 3-methoxymethyl-7-amino-Δ³-cephem-4-carboxylic acid, or 3-methylthiomethyl - 7 - amino-Δ³-cephem-4-carboxylic acid or an ester thereof with the 3-hydroxyphenylglycine in which the glycine amino group is protected during the acylation step with any known protecting group commonly used in protecting amino groups in amino acid or peptide chemistry. A few examples of such protecting groups are the enamine from methyl acetoacetate, tert-butoxycarbonyl, benzyloxycarbonyl, and 2,2,2-trichloroethoxycarbonyl. After the acylation step is completed the amino protecting group is removed by treatment with an acid such as p-toluenesulfonic acid, or by reductive cleavage, e.g., by treatment with zinc in an acid such as hydrochloric or formic acid or by hydrogenation in the presence of a hydrogenation catalyst such as palladium or rhodium on a carbon or barium sulfate support. The N-protected-(3''-hydroxyphenyl)glycine can be activated with a carbodiimide or used as the acid chloride or bromide, or as a mixed anhydride, especially with a lower alkyl carbonic acid. Acylation procedures for this purposes are well known to those skilled in the art.

The compounds of this invention can be prepared by a variety of methods. One method for preparing the 3-methoxy-methyl compounds starts with a penicillin or a penicillin salt such as the sodium or potassium salt of penicillin V (phenoxymethyl penicillin) or penicillin G (phenylmethyl penicillin), or any other penicillin which is in plentiful and economical supply. To place the preparation of such new compounds of this invention in perspective relative to earlier discoveries in the conversion of penicillins to cephalosporin compounds a summary of steps is given, using phenoxymethyl penicillin (penicillin V) as an example, in the process route to the 3-methoxymethyl compounds of this invention.

(1) Phenoxymethylpenicillin is converted to the sulfoxide and esterified with an ester group which can be easily removed by acid hydrolysis methods or hydrogenation methods later in the process. Alternatively, the penicillin can be esterified first and converted to the penicillin sulfoxide thereafter;

(2) The phenoxymethylpenicillin sulfoxide ester is heat treated according to the Morin-Jackson process referred to above as improved by the Cooper and Hatfield improvements to form the corresponding Δ³-cephalosporin ester, 7-phenoxyacetamido-3-methyl-Δ³-cephem - 4 - carboxylate; the Δ³-cephalosporin ester is cleaved to the corresponding acid and then converted to the Δ²-cephalosporin ester, by the Murphy method described in U.S. application Ser. No. 759,490, filed September 12, 1968, now abandoned.

(3) The Δ²-cephalosporin ester is treated according to our described procedure referred to above to form the corresponding 7 - phenoxyacetamido-3-bromomethyl-Δ²-cephem-4-carboxylate ester, and then with methanol to form, e.g., p-methoxybenzyl 7 - phenoxyacetamido - 3 - methoxymethyl-Δ²-cephem-4-carboxylate as product.

(4) The product of step (3) is then oxidized in a suitable solvent with m-chloroperbenzoic acid, or other oxidizing agent, to form the p-methoxybenzyl 7-phenoxyacetamido-3-methyl-$\Delta^3$-cephem - 4 - carboxylate-1-oxide (the sulfoxide) ester.

(5) The sulfoxide ester from step (4) is thereafter treated with an appropriate reducing agent such as sodium dithionite in the presence of an acyl halide such as acetyl chloride to form as product p-methoxybenzyl 7-phenoyacetamido - 3 - methoxymethyl-$\Delta^3$-cephem-4-carboxylate.

(6) The 7-acyl group from the ester from step (5) can be cleaved by treating the ester first with $PCl_5$ in the presence of a tertiary amine such as pyridine or N,N-dimethylaniline then with methanol, and then with water to form the p-methoxybenzyl 7-amino-3-methoxymethyl-$\Delta^3$-cephem-4-carboxylate ester nucleus, as such, or can be treated with a $C_6$ to $C_{12}$ aromatic hydrocarbon sulfonic acid to form the salt such as the p-toluenesulfonate (tosylate) salt.

(7) The new ester nucleus or its tosylate salt from step (6) can then be de-esterified to obtain the nucleus acid zwitterion, the nucleus is re-acylated as described above with an acylating form of 3-hydroxyphenylglycine, e.g., with an isobutyl or sec-butyl mixed anhydride form of D-$\alpha$-(blocked amino)-$\alpha$-(3-hydroxyphenyl)acetic acid to form the 7-[D-$\alpha$-(blocked amino) - $\alpha$-3' - hydroxyphenyl)acetamido]-3methoxymethyl-$\Delta^3$-cephem-4-carboxylic acid. A suitable blocking group is tert-butoxy carbonyl, benzyloxycarbonyl or the enamine formed with methyl acetoacetate.

(8) The acid from step (7) is treated by known methods to remove the amino blocking group to obtain 7-[D-$\alpha$-amino - (3'-hydroxyphenyl)acetamido]-3-methoxymethyl-$\Delta^3$-cephem-4-carboxylic acid, as such, or in the zwitterionic or pharmaceutically acceptable salt form such as the sodium, potassium, cationic salts, by reaction with sodium acetate, potassium acetate, or the like, or as anionic salts with suitable strong acids having a pKa of less than 4 such as hydrochloric, hydrobromic, sulfuric or like acids.

The 3-methylthiomethyl - 7 - amino-$\Delta^3$-cephem-4-carboxylic acid can be prepared by treating 7-amino-cephalosporanic acid (7-ACA) with methyl mercaptan or treating 3 - acetoxymethyl-7-phenoxyacetamido-$\Delta^3$-cephem-4-carboxylic acid with methyl mercaptan, protecting the carboxyl group, e.g., by ester formation, and then cleaving the phenoxyacetyl group by reaction with phosphorus pentachloride in the presence of a tertiary amine such as pyridine or N,N-dimethylaniline followed by treatment with a lower alkanol, then with water or aqueous acid to form the 3-methylthiomethyl-7-amino-$\Delta^3$-cephem-4-carboxylic acid ester. After acylation of this compound with the N-protected 3-hydroxy-phenylglycine the ester group can be removed to regenerate the free carboxylic acid. The 3-methylthiomethyl-7-amino-3-cephem-4-carboxylic acid or ester starting material can also be prepared by reacting methyl mercaptan with a 3-halomethyl-$\Delta^3$-cephalosporin ester of the 1-oxide thereof as described in the Murphy/Webber United States application Ser. No. 811,-640, filed Mar. 28, 1969, now abandoned, and Ser. No. 883,231, filed Dec. 8, 1969, now abandoned but replaced by U.S. application Ser. No. 62,699, filed Aug. 10, 1970. Briefly, by that procedure, a phosphorus halide is reacted with a 3-hydroxymethyl-$\Delta^3$-cephalosporin sulfoxide ester in the presence of a tertiary amine in a substantially anhydrous liquid diluent at a temperature of from about $-75°$ C. to about 50° C. to form as product the corresponding:

(1) 3-halomethyl-$\Delta^3$-cephalosporin ester from at least an equimolar amount of phosphorous trichloride or phosphorous tribromine when temperatures above about $-25°$ are used, or (2) 3 - halomethyl - $\Delta^3$ - cephalosporin sulfoxide ester from an approximately equimolar amount of phosphorous tribromide or phosphorus trichloride when temperatures below about $-25°$ C. are used, or (3) 3 - halomethyl - $\Delta^3$ - cephalosporin sulfoxide ester from phosphorus pentachloride, phosphorus pentabromide, phosphorus oxychloride or phosphorus oxybromide. After the 3-methylthiomethyl group has been incorporated into the cephalosporin compound, any sulfoxide group (1-oxide) can be reduced by methods now known, e.g., by treatment with stannous chloride in the presence of acetyl chloride, and the 7-acyl group of the 7 - acylamido - 3 - methylthiomethyl-$\Delta^3$-cephem-4-carboxylate ester can be treated with phosphorus pentachloride, and pyridine, followed by treatment with methanol, and then with water or aqueous acid to form the 7-amino-3-methylthiomethyl-$\Delta^3$-cephem - 4 - carboxylate nucleus ester. This nucleus ester may be isolated as the tosylate salt, converted to the 7-amino-3-methylthiomethyl-$\Delta^3$-cephem-4-carboxylic acid zwitterion, which acid can be acylated by known procedures with the N-protected form of 3-hydroxyphenylglycine as such or in an activated form to obtain the 7-[D-2'-(3''-hydroxyphenyl)-2-(N-protected-amino) acetamido]-3-methylthiomethyl-$\Delta^3$-cephem-4-carboxylic acid. The N-protecting group, e.g., the enamine from methyl acetoacetate, can be removed with acid in the presence of water, e.g., aqueous hydrochloric, sulfuric, p-toluenesulfonic, or the like, to form the 7-[D-2'-(3''-hydroxyphenyl) - 2' - amino-acetamido] - 3 - methylthiomethyl-$\Delta^3$-cephem-4-carboxylic acid which can be isolated as the zwitterion at its isoelectric point.

The new compounds of this invention are useful as antibiotics for therapy in animals, including humans, against bacterial and other micoorganism infections, or as intermediates in chemical processes for making the antibiotic form of these compounds.

The cephalosporin betaines (inner salts) and the physiologically acceptable salt forms thereof and hydrated forms of such compounds, are efficiently absored from the alimentary tract, give good blood levels, and are quite potent antibiotics, and thus are of particular interest for use as oral anibiotics administered in liquid or solid formulations in doses of from about 50 mg. to 500 mg. of the compound per dose, in the form of appropriately sized capsules, tablets or other pharmaceutical form. The duration of treatment will depend upon the condition being treated, the weight of the patient, the seriousness of the disease condition, as determined by the patient's physician. These compounds can also be dissolved in appropriate solvents such as physiological saline or dextrose solutions and administered by intramuscular injections, or by intravenous methods. Other acid and basic salts of these compounds are useful as intermediates in the processing of the antibiotic out of its preparation reaction mixture.

The preparation of the compounds of this invention is further illustrated by the following detailed examples.

EXAMPLE 1

This example details how the 7-amino-3-methylthiomethyl-$\Delta^3$-cephem-4-carboxylic acid nucleus, esters, thereof, and sulfonic acid salts of such compounds can be made in preparing the new compounds of this invention.

(A) Preparation of tert-butyl 7-(phenoxyacetamido)-3-bromomethyl-$\Delta^2$-cephem-4-carboxylate A solution of 8.08 g. (20 mmoles) of tert-butyl 7-(phenoxyacetamido) - 3 - methyl - $\Delta^2$ - cephem-4-carboxylate, 5.0 g. of N-bromosuccinimide, and 50 mg. of azobisisobutyronitrile in 800 ml. of carbon tetrachloride was refluxed under nitrogen until a negative starch iodide test was obtained (5 hours). The reaction mixture was cooled, the succinimide removed by filtration and the solvent removed under reduced pressure to give 11.8 g. of crude product. A nuclear magnetic resonance spectrum (NMR) showed only the desired tert-butyl 7-phenoxyacetamido - 3-bromomethyl-$\Delta^2$-cephem-4-carboxylate contaminated with traces of succinimide (yield >90 percent).

(B) Preparation of tert-butyl 7-(phenoxyacetamido)-3-bromomethyl-$\Delta^3$-cephem-4-carboxylate-1-oxide To a solution of 80 mmoles of tert-butyl 7-phenoxyacetamido - 3 - bromomethyl-$\Delta^2$-cephem-4-carboxylate, prepared in the manner described in part (A) in 1 liter of a 1:1 carbon tetrachloride: methylene chloride mixture at ice temperature there was added dropwise a solution of 15.2 g. (80 mmoles) of 3-chloroperbenzoic acid in 500 ml. of methylene chloride. After 1 hour at ice temperature, 10 ml. of N,N-dimethylaniline was added and the reaction mixture was stirred for 72 hours to form the tert - butyl 7 - phenoxyacetamido - 3-bromomethyl-$\Delta^3$-cephem-4-carboxylate-1-oxide, at 25° C. to insure complete reaction. The solvent was then reduced in volume to 1 liter by evaporation and then the mixture was cooled to —10° C. To this stirred solution of tert-butyl 7-(phenoxyacetamido) - 3 - bromomethyl - $\Delta^3$ - cephem-4-carboxylate-1-oxide was added dropwise a solution of 8 ml. (80 mmoles) of phosphorus tribromide in 500 ml. of methylene chloride. After the addition was completed, the reaction mixture was stirred for another 30 minutes. The reaction mixture then evaporated to dryness and the residue suspended in a mixture of 500 ml. of ethyl acetate and 500 ml. of 10 percent sodium chloride in water solution. The ethyl acetate layer was successively washed with 3 percent hydrochloric acid twice, 5 percent sodium bicarbonate in water solution, and then dried over sodium sulfate and evaporated to dryness to give 36.0 g. of crude tert-butyl 7 - (phenoxyacetamido) - 3-bromomethyl-$\Delta^3$-cephem-4-carboxylate.

(C) Preparation of tert-butyl 7-(phenoxyacetamido)-3-methylthiomethyl-$\Delta^3$-cephem-4-carboxylate A solution of 4.5 g. of tert-butyl 7-phenoxyacetamido-3-bromomethyl-$\Delta^3$-cephem-4-carboxylate, prepared in the manner described in part (B) above, in 14 ml. of N,N-dimethylformamide (DMF) was stirred at 25° C. for 16 hours with 14 ml. of methyl mercaptan in a pressure reaction bottle (autogeneous pressure). The methyl mercaptan was then removed by distillation and the residue was poured into water and extracted with 150 ml. of benzene. The benzene solution was washed with 10 percent sodium chloride in water solution, twice with 3 percent hydrochloric acid and once with saturated sodium bicarbonate in water solution, and then dried over sodium sulfate and evaporated to dryness to give 3.7 g. of substantially pure tert-butyl 7-(phenoxyacetamido)-3-methylthiomethyl-$\Delta^3$-cephem-4-carboxylate product. An NMR spectrum of this product showed very clean material with a trace of dimethylsulfide as the only contaminant.

(D) Cleavage of the phenoxyacetyl side chain to form tert - butyl 7-amino-3-methylthiomethyl-$\Delta^3$-cephem-4-carboxylate A mixture of 750 mg. (1.67 mmoles) of tert-butyl 7-phenoxyacetamido - 3 - methylthiomethyl-$\Delta^3$-cephem-4-carboxylate, 580 mg. (2.8 mmoles) of phosphorus pentachloride and 22.1 mg. (0.225 ml., 2.8 mmoles) of pyridine was stirred in 75 ml. of dry benzene in a bath maintained at 55° C. After three hours the reaction solution was evaporated. The residue was dissolved in 100 ml. of methanol and refrigerated overnight. The solution was then evaporated and the residue was then dissolved in a chilled mixture of 50 ml. of tetrahydrofuran (THF) and 50 ml. of pH 4.5 citrate buffer. After 35 minutes the THF was evaporated. The aqueous solution was overlayered with ethyl acetate and the pH of the mixture was adjusted to 7.0 by the addition of a solution of dibasic sodium phosphate. The ethyl acetate solution was washed with aqueous saturated sodium chloride solution, dried over magnesium sulfate, and evaporated. The crude product, tert - butyl 7 - amino - 3-methylthiomethyl-$\Delta^3$-cephem-4-carboxylate, was then redissolved in 20 ml. of ethyl acetate. A solution of p-toluenesulfonic acid in ethyl acetate was added until the resulting solution was shown to be acidic on pH paper. After 30 minutes cooling in an ice bath the crystalline precipitate was collected, washed with ethyl acetate, and dried in a vacuum oven at room temperature, yielding 370 mg. of tert-butyl 7-amino-3-methylthiomethyl-$\Delta^3$-cephem-4-carboxylate as its p-toluenesulfonate salt, M.P. 182–5° C. (d). The structure was confirmed by nuclear magnetic resonance spectral analysis:

Calcd. (percent): C, 49.16; H, 5.78; N, 5.73. Found (percent): C, 49.09; H, 5.80; N, 5.66.

(E) Preparation of 7-amino-3-methylthiomethyl-$\Delta^3$-cephem-4-carboxylic acid A solution of 412.7 mg. (0.84 mmole) of tert-butyl 7 - amino - 3 - methylthiomethyl-$\Delta^3$-cephem-4-carboxylate p-toluenesulfonic salt, prepared as described above, in 5 ml. of formic acid was allowed to stand at room temperature for two hours. The reaction mixture was evaporated to dryness and the oily residue taken up in a mixture of 10 ml. of ethyl acetate and 6 ml. of water. While cooling, the pH of this mixture was adjusted to 8.5 with dilute ammonium hydroxide solution. The aqueous layer is separated and the pH was adjusted to 3.8 with 6 N-hydrochloric acid. After cooling for two hours the white crystalline precipitate that has separated was collected and dried in a vacuum oven at 35° C., yielding 166.3 mg. of 7-amino-3-methylthiomethyl-$\Delta^3$-cephem-4-carboxylic acid. The structure was confirmed by the nuclear magnetic resonance spectrum and elemental analysis:

Calcd. (percent): C, 41.54; H, 4.65; N, 10.77. Found (percent): C, 41.70; H, 4.90; N, 10.52.

(F) Preparation of 7-[D-2'-(3''-hydroxyphenyl)-2'-amino-acetamido] - 3 - methylthiomethyl-$\Delta^3$-cephem-4-carboxylic acid A solution of 169 mg. (0.64 mmole) of D-2-tert-butoxycarboxamido-2-(3'-hydroxyphenyl)acetic acid was prepared in 25 ml. of THF. The solution was cooled to —5° C. and 65 mg. (0.64 mmole, 0.089 ml.) of triethylamine and 87 mg. (0.083 ml., 0.64 mmole) of isobutylchloroformate were added to form the mixed anhydride. After 20 minutes there was added a cold (0° C.) solution of 150 mg. (0.58 mmole) of 7-amino-3-methylthiomethyl-$\Delta^3$-cephem-4-carboxylic acid in 10 ml. of aqueous THF containing an equivalent of triethylamine. After stirring the reaction for 3 hours, the THF was removed in vacuo and the solution was stirred in 100 ml. of water, then overlayered with 100 ml. of ethyl acetate. While cooling in an ice bath, the pH was adjusted to 2.0 with 6 N-hydrochloric acid. The ethyl acetate solution was dried with magnesium sulfate and evaporated. The residue was taken up in ethyl ether and then excess "Skellysolve B" solvent was added to produce a white solid in a yield of 156.5 mg. This material, 7-[D-2''-tert-butoxycarboxamido - 2' - (3''-hydroxyphenyl)acetamido]-3-methylthiomethyl - 4 - carboxylic acid was not further purified, but 150 mg. of it was dissolved in 3 ml. of cold trifluoroacetic acid. After 3 minutes the solution was evaporated. (On a larger manufacturing scale where economy is important it would be preferable to use p-toluenesulfonic acid in acetonitrile, chloroform or nitromethane to remove the tert-butoxycarbonyl protecting group.) The residue was stirred in 10 ml. of water and tributylamine was added to pH 5. After two extractions with methyl isobutyl ketone to remove impurities, the aqueous solution was evaporated to near dryness, then diluted with 10 ml. of acetonitrile. The precipitated solid was collected, washed with acetonitrile and vacuum dried, yielding 56.4 mg. of 7-[D-2'-amino-(3''-hydroxyphenyl)acetamido) - 3 - methylthiomethyl - $\Delta^3$-cephem-4-carboxylic acid. Satisfactory elemental analysis was not obtained on this amorphous material but the structure of the compound was confirmed by UV and NMR spectral analyses. Another sample of the same compound analyzed for carbon, hydrogen and nitrogen was as follows:

Analysis.—Calcd. for $C_{17}H_{19}N_3S_2O_5$ (percent): C, 49.88; H, 4.68; N, 10.27. Found (percent): C, 50.61; H, 5.49; N, 9.94.

The product, 7-[D-2'-amino-2-(3''-hydroxyphenyl)acetamido]-3-methylthiomethyl - $\Delta^3$ - cephem - 4 - carboxylic acid had an oral median effective dose ($ED_{50}$) value in mice against *Streptococcus pyogenes*, of 0.45 mg./kg.×2 against a challenge dose of 1500 $LD_{50}$, compared with an oral $ED_{50}$ value of 2.3 mg./kg.×2 for cephalexin in the same test. The product had a minimum inhibitory concentration (MIC) of <0.03 μg./ml. against *Streptococcus pyogenes* strain C203, as compared with an MIC value of 0.5 for cephalexin in the same test. The product had an MIC value of 0.31 μg./ml. against *Diplococcus pneumoniae*, Park I strain, as compared to an MIC value of 2.5 μg./mg. for cephalexin in the same test.

In agar gradient plate screening tests, the product gave the following minimum inhibitory concentration (MIC) values compared to cephalexin.

|  | Product, MIC | Cephalexin (μg/ml.) |
| --- | --- | --- |
| *Staphylococcus aureus* V30 [1] | 0.7, 1.0 | 4.1, 3.8 |
| *S. aureus* V32 [1] | 0.8, 1.0 | 3.9, 6.8 |
| *S. aureus* X400 [2] | >20 | >20 |
| *S. aureus* V84 [1] | 0.6, 1.0 | 2.8 |
| Shigella N-9 | 5.8 | 8.7 |
| *E. coli* N-10 | 7.7 | 7.8 |
| *E. coli* N-26 | 7.0 | 8.3 |
| Klebsiella sp X-26 | 5.8 | 6.2 |
| Enterobacter sp. X-68 | 3.4 | 5.8 |
| *S. heidelberg* X-514 | 2.7 | 5.4 |
| Pseudomonas sp X-528 | >50 | >50 |

[1] V30, V32, and V84 are strains of gram-positive penicillin G resistant *Staphylococcus aureus*.
[2] X400 is a strain of *Staphylococcus aureus* which is resistant to both penicillin G and methicillin.

(1) N–9, N–10, N–26, X–68, K–1 are all Gram-negative microorganisms

N–9 is Shigella sp.
N–10 is an *E. coli* strain
N–26 is an *E. coli* strain
X–26 is *Klebsiella pneumonia*
X–68 is Enterobacter, sp.
K–1 is Klebsiella (2) Each of these test compounds showed no antibiotic activity in this test against X–528, a Pseudomonas bacteria at a concentration of 50 micrograms/ml. To date, few cephalosporins have shown any activity against Pseudomonas sp. organisms.

EXAMPLE 2

Preparation of 7-[D-2'-amino-2'-(3'''-hydroxyphenyl)-acetamido]-3-methoxymethyl-$\Delta^3$ - cephem-4-carboxylic acid betaine (A) 4-methoxybenzyl 7 - (phenoxyacetamido)-3-methoxymethyl-$\Delta^3$-cephem-4-carboxylate.—To a stirred suspension of 6.98 g. (0.002 mole) of $\Delta^2$-desacetoxy ceph V acid [3-methyl-7-(phenoxyacetamido)-$\Delta^2$-cephem-4-carboxylic acid] and 2.8 g. (0.002 mole) of 4-methoxybenzyl alcohol in 100 cc. of methylene chloride was added a solution of 4.62 g. of dimethylformamide dineopentyl acetal in 25 cc. of methylene chloride. Dissolution was complete in a few minutes. The reaction mixture was stirred for 48 hours at room temperature to insure complete reaction. The solvent was removed, and benzene was added. The resulting solution was washed three times with aqueous sodium bicarbonate solution, twice with aqueous sodium chloride solution, dried over magnesium sulfate, filtered and evaporated. The residue was crystallized from carbon tetrachloride to give 6.74 g. (92 percent yield, from unrecovered $\Delta^2$-acid) of the 4-methoxybenzyl 3-methyl-7-phenoxyacetamido)-$\Delta^2$-cephem-4-carboxylate ester, M.P. 108–112° C.

The aqueous sodium bicarbonate spent liquors were layered with ethyl acetate, cooled, and adjusted to pH 2.5. The organic layer yield 1.56 g. of colorless, crystalline 3 - methyl-7-phenoxyacetamido-$\Delta^2$-cephem-4-carboxylic acid, which could be reused in the esterification process.

Functionalization of 3-methyl group.—A 1.17 g. portion of 4-methoxybenzyl 3-methyl-7-phenoxyacetamido-$\Delta^2$-cephem-4-carboxylate ester was treated with N-bromosuccinimide in carbon tetrachloride in the presence of azobisisobutyronitrile to form 4-methoxybenzyl 3-bromomethyl-7-phenoxyacetamido-$\Delta^2$-cephem - 4 - carboxylate ester. This $\Delta^2$-allylic bromide-ester was dissolved in 100 cc. of absolute methanol containing 2 molar equivalents of N,N-diethyl aniline to absorb hydrogen bromide byproduct. This mixture was stirred at room temperature for 24 hours to insure complete reaction, and then evaporated to dryness, taken up in benzene, extracted twice with cold 5 percent hydrochloric acid solution, sodium bicarbonate solution, sodium chloride solution, dried over magnesium sulfate, filtered and evaporated to give 970 mg. of a brown oil. This brown oil was chromatographed over a column of silica gel containing 15 percent water, using a mixture of benzene and ethyl acetate as eluate. A benzene solution containing about 4 percent ethyl acetate eluted about 15 percent unreacted desacetoxy starting material. A benzene solution containing about 8 percent ethyl acetate eluted the 4-methoxybenzyl 3-methoxymethyl-7-phenoxyacetamido-$\Delta^2$-cephem - 4 - carboxylate ester, M.P. 116–118, from methanol, in 40 percent yield. The structure was confirmed by nuclear magnetic resonance spectrum and elemental analysis.

Sulfoxide formation.—To a cooled solution of 215 mg. of the 4-methoxybenzyl 3-methoxymethyl-7-phenoxyacetamido-$\Delta^2$-cephem-4-carboxylate ester product of this invention in 5 cc. of chloroform, there was added a solution of 85 mg. of m-chloroperbenzoic acid (88 percent pure) in chloroform. The mixture was stirred and allowed to warm slowly over 1 hour. The chloroform was washed with sodium bicarbonate solution, sodium chloride solution, dried over magnesium sulfate, filtered, and evaporated. The solid residue was crystallized from benzene containing methylene chloride to give 82 mg. of 4-methoxybenzyl 3-methoxymethyl-7-phenoxyacetamido-$\Delta^3$-cephem-4-carboxylate-1-oxide, M.P. 183–185° C., which gave a satisfactory elemental analysis.

Further experiments have shown that hydroxylic solvents such as isopropanol or tert-butanol give better yields than chloroform in this reaction.

Reduction of sulfoxide.—To a solution of 1.028 g. (0.002 mole) of the 4-methoxybenzyl 3-methoxymethyl-7-phenoxyacetamido-$\Delta^3$-cephem-4-carboxylate-1-oxide in 75 cc. of dry dimethylformamide was added 15 cc. of acetyl chloride and then 6 g. of sodium dithionite ($Na_2S_2O_4$). After stirring at room temperature for 4 hours, the resulting mixture was cooled and benzene and aqueous sodium bicarbonate solution were added. After decomposition of the excess acetyl chloride was completed, water was added, and the mixture was extracted twice with benzene. The combined benzene extracts were washed with aqueous sodium bicarbonate solution, and then with sodium chloride solution, and then dried over magnesium sulfate, filtered, and evaporated to give 1.32 g. of crude dark brown semi-solid 4-methoxybenzyl 3-methoxymethyl-7-phenoxyacetamido-$\Delta^3$-cephem-4-carboxylate.

(B) p-Methoxybenzyl 7-amino-3-methoxymethyl-$\Delta^3$-cephem-4-carboxylate p-toluenesulfonate salt To a solution of 996 mg. (2 mM.) of p-methoxybenzyl 7 - phenoxyacetamido-3-methoxymethyl-$\Delta^3$-cephem-4-carboxylate and 221.5 mg. dry pyridine (1.4 eq.) in 75 cc. dry benzene was added 601 mg. (40 percent excess) of phosphorus pentachloride. The mixture was heated under $N_2$ for two hours at 50° C. The benzene was removed by evaporation under reduced pressure and 100 cc. of ice-cold methanol was added. After standing at room temperature overnight the methanol was removed by evaporation under reduced pressure. To the residue was added 40 cc. THF, and, after cooling, 40 cc. water was added. This homogeneous mixture was allowed to stand 25 minutes; THF was removed under reduced pressure, ethyl acetate and some water added, and the pH adjusted to 6.5 with solid NaHCO$_3$. The organic layer was removed, washed twice with saturated NaCl solution, dried with MgSO$_4$, filtered, and evaporated to a small volume. To a solution of the crude p-methoxybenzyl 7-amino-3-methoxymethyl-Δ$^3$-cephem-4-carboxylate obtained therefrom in a total of 80 cc. of ethyl acetate was added a solution of 380 mg. (2 mM.) p-toluenesulfonic acid monohydrate in 10 cc. ethyl acetate. The p-toluenesulfonate salt began to crystallize within a few minutes. After 3 hours, the crystals were collected by suction filtration: 781 mg. (73 percent), M.P. 160–164° C., structure confirmed by I.R., UV, N.M.R., and elemental analysis.

(C) 7-amino-3-methoxymethyl-Δ$^3$-cephem-4-carboxylic acid

To a 268 mg. (1 millimole) portion of the p-toluenesulfonate salt of p-methoxybenzyl 7-amino-3-methoxymethyl-Δ$^3$-cephem-4-carboxylate, stirred in water, there was added disodium orthophosphate to pH 7 while overlaying the solution with ethyl acetate. The ethyl acetate solution was dried over magnesium sulfate and evaporated to dryness. The oily residue was dissolved in 25 ml. of benzene containing 40 drops of anisole and 0.8 ml. of trifluoroacetic acid. After stirring the mixture for 2 hours at room temperature, the benzene was evaporated and the residue was taken up in 10 ml. of water overlayered with 10 ml. of ethyl acetate. The pH was adjusted to 3.6 by the addition of triethylamine. After refrigerating the mixture overnight, the solid was collected, washed with water, and ethyl acetate and vacuum dried at 45° C. yielding 75 mg. of 7-amino-3-methoxymethyl-Δ$^3$-cephem-4-carboxylic acid. The structure was confirmed by infrared (IR), ultraviolet (UV), and nuclear magnetic resonance and (NMR) spectra.

(D) 7-[D-2-amino-2-(3''-hydroxyphenyl)acetamido]-3-methoxymethyl-3-cephem-4-carboxylic acid A solution of 373 mg. (1.4 mmoles) of D-2-t-butoxycarboxamido-2-(3'-hydroxyphenyl)acetic acid was prepared in 30 ml. of tetrahydrofuran (THF). The solution was cooled to −10° C. and 156 mg. (0.21 ml., 1.54 mmoles) of triethylamine and 210 mg. (0.21 ml., 1.54 mmoles) of isobutyl chloroformate were added. To this resulting mixed anhydride solution was added a cold solution of 342 mg. (1.4 mmoles) of 7-amino-3-methoxymethyl-3-cephem-4-carboxylic acid in 20 ml. of 50 percent aqueous THF containing an equivalent of triethylamine. After stirring for 3 hours, the reaction solution was partially evaporated to remove the THF. It was then stirred with 100 ml. of water, then overlayered with 100 ml. of ethyl acetate. The pH was adjusted to 2.0 with 6 N hydrochloric acid. The ethyl acetate layer was separated, washed with water and saturated sodium chloride solution, dried (MgSO$_4$) and evaporated. The residue was dissolved in 20 ml. of diethyl ether, then precipitated by the addition of excess (almost 50 ml.) of "Skellysolve B." After refrigeration, the solid was collected, washed with "Skellysolve B" and vacuum dried, yielding 534 mg. of 7-[D-2'-t-butoxycarboxamido - 2' - (3'' - hydroxyphenyl)acetamido]-3-methoxymethyl - 3 - cephem - 4 - carboxylic acid. This crude material was not further purified but was dissolved in 6 ml. of cold (0° C.) trifluoroacetic acid. After five minutes the solution was evaporated. It was then dissolved in 2 ml. of water, overlayered with 10 ml. of methyl isobutyl ketone and then tributylamine was added to a pH of 5. The water layer was separated, washed with methyl isobutyl ketone and concentrated in vacuo to about 0.5 ml. It was then diluted with 5 ml. of acetonitrile. Crystallization began after scratching the sides of the flask. It was refrigerated several hours. The solid was then collected, washed with acetonitrile and vacuum dried at 50° C., yielding 249.1 mg. of 7-[D-2'-amino - 2' - (3'' - hydroxyphenyl)acetamido] - 3 - methoxymethyl 3-cephem-4-carboxylic acid. The structure was confirmed by NMR, UV, and by a microanalysis:

Calcd. for $C_{17}H_{19}N_3O_6S \cdot H_2O$ (percent): C, 49.62; H, 5.15; N, 10.21. Found (percent): C, 49.76; H, 5.27; N, 10.21.

The product, 7-[D-2'-amino-2'-(3''-hydroxyphenyl)-acetamido]-3-methoxymethyl-Δ$^3$ - cephem - 4 - carboxylic acid, had an oral median effective dose (ED$_{50}$) value in mice of 0.57 mg./kg.×2 against a challenge dose of 770 LD$_{50}$ of *Streptococcus pyogenes*, strain 203, and a minimum inhibitory concentration (MIC) of <0.03 μg./ml. against the same organism in standard tests. It had an MIC of 0.5 μg./ml. against *Diplococcus pneumoniae*, Park I strain, TSB with 5 percent rabbit blood, 10$^5$ bacteria/ml. innocula as compared with an MIC value of 4.0 μg./ml. for cephalexin in the same test.

In agar gradient plate screening tests, the product gave the following minimum inhibitory concentration (MIC) values compared to cephalexin.

| | Product, MIC | Cephalexin (μg./ml.) |
|---|---|---|
| *Staphylococcus aureus* V30[1] | 0.9, 1.0 | 4.1, 3.8 |
| *S. aureus* V32 | 1.0, 1.0 | 3.9, 6.8 |
| *S. aureus* [2] X400 | >20, >20 | >20 |
| *S. aureus* V84 | 0.8, 1.0 | 2.8 |
| *Shigella* N-9 | 10.6 | 8.7 |
| *E. coli* N-10 | 7.8 | 7.8 |
| *E. coli* N-26 | 7.1 | 8.3 |
| *Klebsiella* sp. X26 | 6.2 | 6.2 |
| *Enterobacter* sp X68 | 4.9 | 5.8 |
| *S. heidelberg* X514 | 6.0 | 5.4 |
| *Pseudomonas* sp X528 | >50 | >50 |
| *Serratia marcesians* X99 | | |

See Example 1 for footnotes.

EXAMPLE 3

This example summarizes and compares the antibiotic activity of four cephalosporin compounds having the general structure

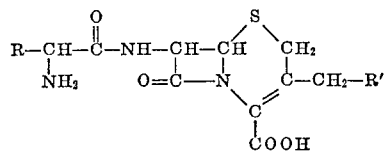

where R and R' were as follows

| Compound number | R | R' |
|---|---|---|
| 1 | m-OH-phenyl | —SCH$_3$ |
| 2 | do | —OCH$_3$ |
| 3 | Phenyl | —OCH$_3$ |
| 4 | do | —H | in an agar-dilution procedure test for MIC determination using undiluted inocula. The Bauer-Kirby disc method was used. Compounds 1 and 2 are claimed herein as new compounds. In this test, trypticase soy broth with 5 percent rabbit blood (5 ml.) was used. The organism innocula consisted of 1 drop from an undiluted culture (10$^5$ ml.) of the respective organisms. The MIC values were determined after incubation overnight at 37° C.

BACTERIAL SUSCEPTIBILITY BY BROTH-DILUTION METHOD*

| | Minimal inhibitory conc. (μg./ml.) | | | |
|---|---|---|---|---|
| Organism | 1 | 2 | 3 | 4 |
| *Streptococcus* sp. (A) C203 | <0.03 | <0.03 | 0.125 | 0.5 |
| *Streptococcus* sp. 12385 | 0.06 | 0.25 | 0.25 | 0.5 |
| *Streptococcus* sp. (VIR) 9943 | 1.0 | 2.0 | 2.0 | 8.0 |
| *Streptococcus* sp. (D) 9960 | 64 | 128 | 128 | 128 |
| *Diplococcus pneumoniae* I | 0.5 | 1.0 | 0.5 | 2.0 |
| *Diplococcus pneumoniae* II | 0.25 | 0.5 | 0.5 | 2.0 |
| *Diplococcus pneumoniae* 7E | 0.5 | 0.5 | 0.5 | 2.0 |
| *Diplococcus pneumoniae* XIV | 0.5 | 1.0 | 0.5 | 4.0 |

*1. Trypticase soy broth with 5 percent rabbit blood. (5 ml.). 2. Inocula—1 drop from undiluted culture (10$^5$/ml.). 3. MIC value determined after overnight at 37° C.

EXAMPLE 4

This example summarizes and compares the oral median effective dose in mice ($ED_{50}$) values, (mg. of compound/kg. of body weight $\times$ 2 doses) minimum inhibitory concentration (MIC) in $\mu g./ml.$, as measured by concentration to the compound in mouse blood for several cephalosporin compounds having the general formula

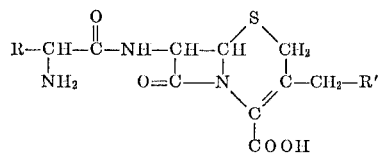

where R and R' are as defined below:

| Compound | R | R' |
|---|---|---|
| 1 | Phenyl | —H |
| 2 | m-OH-phenyl | —H |
| 3 | Phenyl | —SCH$_3$ |
| 4 | m-OH-phenyl | —SCH$_3$ |
| 5 | Phenyl | —OCH$_3$ |
| 6 | m-OH-phenyl | —OCH$_3$ |

ORAL CEPHALOSPORINS

| Compound | Streptococcus pyogenes | | Mouse blood conc. ($\mu g./ml.$) | | | | |
|---|---|---|---|---|---|---|---|
| | Oral* $ED_{50}$ | MIC | 15' | 30' | 60' | 120' | 240' |
| 1 | 1.68–1.8 | 0.5 | 20.3 | 11.0 | 3.9 | | |
| 2 | 1.7–1.95 | | 10 | 10 | 3.28 | 1.44 | 1.01 |
| 3 | 0.73 | .039 | 6.7 | 3.8 | 1.6 | 0.1 | 0.1 |
| 4 | 0.45 | 0.3 | 16.1 | 11.0 | 3.3 | 1.9 | |
| 5 | 1.14 | 0.19 | 8.73 | 8.1 | 4.8 | 1.7 | 0.29 |
| (Retest) | | | 10.74 | 6.67 | 2.76 | 1.77 | 0.8 |
| 6 | 0.57 | 0.25 | 19.6 | 21.3 | 10.2 | 3.3 | 1.0 |

These data show that Compounds 4 and 6 of this table, claimed herein, are approximately three times more potent than cephalexin (Compound 1), in terms of oral $ED_{50}$ value and MIC value in these tests. At the same time they have substantially the same longevity in the blood as cephalexin while being better than compounds 2, 3, and 5 in this regard.

We claim:
1. A compound having a formula

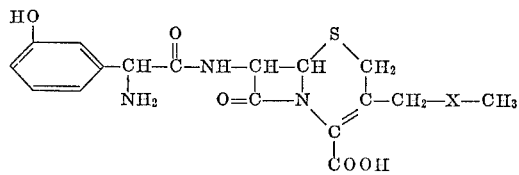

where X is oxygen or sulfur, and physiologically acceptable salts of such compounds.

2. A compound as defined in claim 1 wherein the compound is 3-methoxymethyl 7-[D-2'-(3''-hydroxyphenyl)-2 - aminoacetamido]-$\Delta^3$-cephem-4-carboxylic acid in the zwitterionic form or as the physiologically acceptable acid addition salts thereof.

3. A compound as defined in claim 1 wherein the compound is 3 - methylthiomethyl-7-[D-2'-(3''-hydroxyphenyl)-2'-aminoacetamido]-$\Delta^3$-cephem-4-carboxylic acid addition salt thereof.

4. A compound as defined in claim 2 wherein the compound is 3-methoxymethyl-7-[D-2'-(3''-hydroxyphenyl)-2'-aminoacetamido]-$\Delta^3$-cephem-4-carboxylic acid in the zwitterionic form.

5. A compound as defined in claim 3 wherein the compound is 3 - methylthiomethyl-7-[D-2'-(3''-hydroxyphenyl)-2'-aminoacetamido]-$\Delta^3$-cephem-4-carboxylic acid in the zwitterionic form.

References Cited
UNITED STATES PATENTS

| 3,243,435 | 3/1966 | Cowley et al. | 260—243 C |
| 3,665,003 | 5/1972 | Kennedy et al. | 260—243 C |

NICHOLAS S. RIZZO, Primary Examiner

U.S. Cl. X.R.

424—246